Jan. 1, 1957 H. J. WOLL 2,776,420
TRANSISTOR INDICATOR CIRCUITS
Filed Nov. 1, 1954
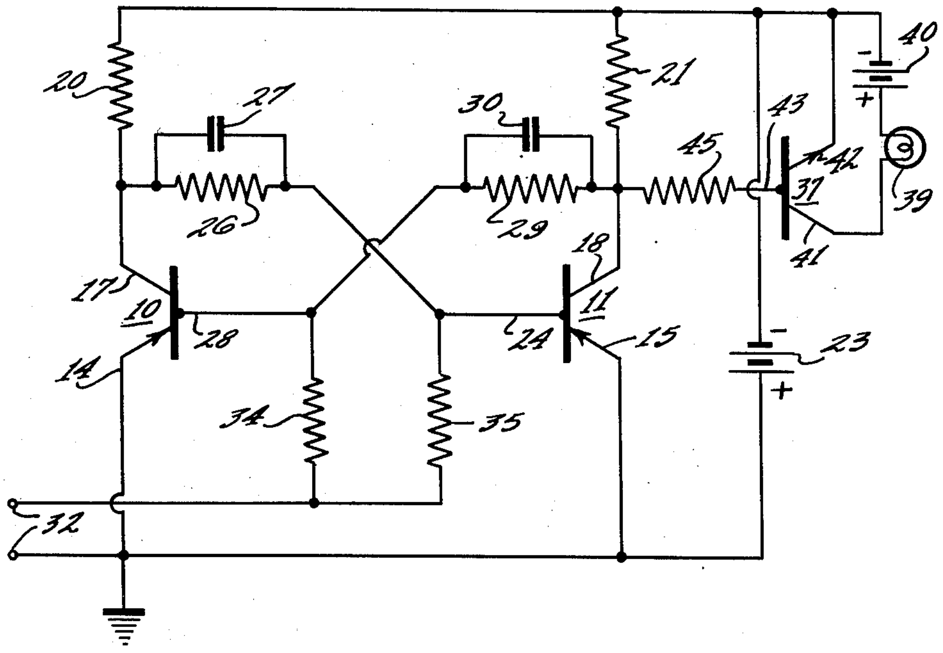
INVENTOR.
Harry J. Woll
BY H. C. Newton
ATTORNEY

United States Patent Office 2,776,420

Patented Jan. 1, 1957

2,776,420

TRANSISTOR INDICATOR CIRCUITS

Harry J. Woll, Haddon Heights, N. J., assignor to Radio Corporation of America, a corporation of Delaware Application November 1, 1954, Serial No. 465,964

The terminal fifteen years of the term of the patent to be granted has been disclaimed 3 Claims. (Cl. 340—252)

This invention relates generally to transistor trigger circuits and relates in particular to transistor circuit means for indicating the electrical state of trigger circuits.

Electrical computer systems employing counters, shift registers and the like have in the past been provided with means for visually detecting the electrical state of trigger circuits utilized therein. In multistage counter circuits employing vacuum tubes, for example, this is often accomplished by connecting a glow discharge lamp, such as a neon lamp, in the plate circuit of each bistable circuit. The glow discharge type of lamp generally requires a fairly large voltage for its operation. This voltage may be derived from the tube circuit to which the glow discharge lamp is connected.

With the advent of transistors, trigger circuits of relative simplicity, small size and low power drain are readily feasible. It has been found that transistor counter stages can be operated successfully at relatively low voltages, thereby reducing the power supply requirement for these trigger stages. Low voltage operation of counter circuits has the further advantage of greater reliability because of the less severe demands which are placed upon the various components of the trigger circuit.

A transistor trigger circuit may often consist of a bistable circuit having two stable electrical states, namely a condition of low collector current and a condition of high collector current. A visual indicator circuit utilizing a lamp should preferably provide that the lamp be turned on when the bistable circuit is in one of its two states, and should be turned off when the bistable circuit is in the other state. Because of the low voltage operation of transistor trigger circuits, the change in voltage at any point in the transistor bistable circuit may not be great enough to operate a lamp of the glow discharge type. It is well known, however, that lamps of the filament type may be made to operate at any desired voltage. This type of lamp may therefore be better suited to use with transistor circuits.

It is therefore a primary object of the present invention to provide an improved indicator circuit for use with transistor trigger circuits.

It is a further object of the present invention to provide an improved indicator circuit in a transistor trigger circuit which may effectively utilize the low voltages encountered in transistor circuits for its successful operation.

It is still a further object of the present invention to provide a circuit for coupling an incandescent lamp to a transistor trigger circuit wherein the operation of the trigger circuit is not adversely affected by the incandescent lamp.

These and further objects of the present invention are accomplished by connecting the base electrode of an isolating transistor through a direct current conductive impedance element connected to the collector electrode of a transistor of the trigger circuit. The isolating transistor preferably may be of opposite conductivity type to the conductivity type of the transistor utilized in the bistable circuit. The collector electrode of the transistor of the bistable circuit is connected to a source of energizing potential through a load resistor. The emitter electrode of the isolating transistor may be connected to the same source of energizing potential in order that variations in voltage across the load resistor are impressed between the base and emitter electrodes of the isolating transistor. An incandescent lamp and a source of energizing potential are connected in series relation between the collector and emitter electrodes of the isolating transistor. Thus, a change in state of the transistor trigger circuit will cause a change in the base current of the isolating transistor which in turn will produce a much larger change in current through the incandescent lamp. This change in state of the bistable circuit will therefore be indicated visually by the incandescent lamp.

The novel features that are considered characteristic of this invention are set forth with particularity in the appended claims. The invention itself, however, both as to its organization and method of operation as well as additional objects and advantages, thereof, will be best understood from the following description when read in connection with the accompanying drawing in which:

The single figure is a schematic circuit diagram of a bistable circuit including an indicator circuit in accordance with the present invention.

Referring now to the drawing, a transistor trigger circuit, shown for illustrative purposes to be a bistable circuit, includes transistors 10 and 11 which are illustrated to be of the P–N–P type, having their emitter electrodes 14 and 15 respectively, connected to ground. It is noted that this bistable circuit is shown for illustrative purposes only and that the indicator circuit of the present invention would be applicable to many other circuit configurations providing triggered operation.

The bistable circuit further includes the collector electrodes 17 and 18 of the transistors 10 and 11 which are connected through direct current conductive load impedance elements illustrated as resistors 20 and 21 respectively to one terminal of a source of energizing potential illustrated as a battery 23, the other terminal of which is connected to a point of substantially fixed reference potential. The base electrode 24 of the transistor 11 is coupled to the collector electrode 17 through the parallel combination of a coupling resistor 26 and a capacitor 27. The base electrode 28 of the transistor 10 is coupled to the collector electrode 18 through the parallel combination of a coupling resistor 29 and a capacitor 30, thereby providing regenerative bistable operation.

Input signals from any convenient source may be applied to a pair of input terminals 32, one of which is connected to ground and the other of which is coupled in parallel to the base electrodes 24 and 28 through a pair of isolating resistors 34 and 35 respectively. Successive input signals will trigger the bistable circuit from an indicating to a non-indicating state and vice-versa.

An isolating transistor 37 of a conductivity type opposite to that of the transistor 11 is provided with an incandesecent lamp 39 and a source of energizing potential illustrated as a battery 40 connected in series relation between its collector electrode 41 and its emitter electrode 42. The emitter electrode 42 is connected to the negative terminal of the battery 23. The base electrode 43 of the transistor 37 is coupled through a direct current conductive impedance element illustrated as a resistor 45 to the collector electrode 18. It is noted that the resistor 45 could be connected to a tap on the load resistor 21 in order to further adjust the magnitude of signal applied between the base electrode 43 and the emitter electrode 42. The resistor 45 may be adjusted to be of proper value to apply the desired amount of signal to the base electrode, as hereinafter described, and may in certain cases be eliminated.

When the transistor 11 is in a state of relatively low conduction, little voltage appears across the load resistor 21. The current into the base electrode 43 is low in value and the high impedance between the collector electrode 41 and the emitter electrode 42 causes the current through the incandescent lamp 39 to be negligible. When, on the other hand, the transistor 11 is in a conducting state, the voltage across the load resistor 21 is of appreciable magnitude and is in a direction to cause the isolating transistor 37 to conduct heavily.

The circuit constants, including the values of the resistor 45 and the load resistor 41 are adjusted so that essentially no voltage appears between the collector electrode 41 and the emitter electrode 42 when the transistor 11 is in a high current conducting state. The incandescent lamp 39 is thereby caused to light by current flowing through it from the battery 40.

The isolating transistor 37 should preferably be operated so that during the period in which the transistor 11 is in a high current conducting state, the transistor 37 is in the saturated state, or in other words, has essentially no voltage between its collector electrode 41 and its emitter electrode 42. When the transistor 11 is in a low current conducting state, the isolating transistor 37 will have very little current flowing through it. Thus, the power dissipated in the transistor 37 will be very small at all times except during the very brief period of transition during which the transistor 11 is being triggered from one state to another. Thus, a relatively small transistor may be utilized as the isolating transistor 37 to control the relatively high currents of the incandescent lamp 39.

The load resistor 21 and the isolating resistor 45 should preferably be adjusted in value so that their parallel combination is equal to the normal load resistance of the transistor 11 without the indicator circuit. Normal operation of the trigger circuit is thereby unaffected by the connection of the indicator circuit.

Indicator circuits in accordance with the present invention readily provide indication with a high degree of reliability of the electrical state of a transistor trigger circuit. The indicator circuit has negligible effect upon the operation of the trigger circuit with which it is assocated. While the indicating device described in connection with this circuit was illustrated as a lamp, other indicating devices such as meters, recorders and the like may also be utilized to perform the indicating function. This invention advantageously utilizes the low voltage characteristics of transistor circuits to provide an efficient, reliable indicator circuit.

What is claimed is:

1. An indicator system for a trigger circuit comprising in combination, a first transistor in said trigger circuit of one conductivity type having a collector electrode, a source of energizing potential for said trigger circuit, a load impedance element connected between the collector electrode of said first transistor and said source of energizing potential, a second transistor of an opposite conductivity type to said first transistor for providing an indication of the electrical state of said first transistor, said second transistor having a base electrode, an emitter electrode, and a collector electrode, direct current conductive means connecting the collector electrode of said first transistor with the base electrode of said second transistor, said emitter electrode being connected to said source of energizing potential, indicator means including an incandescent lamp, means connecting said indicator means and said source between the emitter and collector electrodes of said second transistor, whereby the conduction of said second transistor is indicative of the conduction of said first transistor in said trigger circuit, the parallel combination of said load impedance element with the base-to-emitter circuit impedance of said second transistor providing a predetermined resistive load impedance for said first transistor.

2. An indicator system as defined in claim 1, wherein said direct current conductive means includes a resistor connected between said collector electrode and said base electrode.

3. An indicator system comprising in combination, a trigger circuit including a pair of transistors of one conductivity type each having a collector electrode, a source of energizing potential for said trigger circuit, a first load impedance element connected between the collector electrode of a first of said transistors and said source of energizing potential, a second load impedance connected between the collector electrode of the second of said transistors and said source of energizing potential, a third transistor of an opposite conductivity type to said first pair of transistors having a base electrode, an emitter electrode, and a collector electrode, direct current conductive means connecting the collector electrode of the first of said pair of transistors and with the base electrode of said third transistor, the emitter electrode of said third transistor being connected to said source of energizing potential, indicator means including an incandescent lamp, means for connecting said indicator means and said source between the emitter and collector electrodes of said third transistor, whereby the conduction of said third transistor is indicative of the conduction of said first transistor in said trigger circuit, the values of said first and second load impedance elements being so related that the load impedance of the second of said pair of transistors is equal to the parallel combination of the load impedance of the first of said pair of transistors and the base-to-emitter circuit impedance of said third transistor.

References Cited in the file of this patent

UNITED STATES PATENTS

| | | |
|---|---|---|
| 2,547,386 | Gray | Apr. 3, 1951 |
| 2,665,845 | Trent | Jan. 12, 1954 |
| 2,696,739 | Endres | Dec. 14, 1954 |